UNITED STATES PATENT OFFICE.

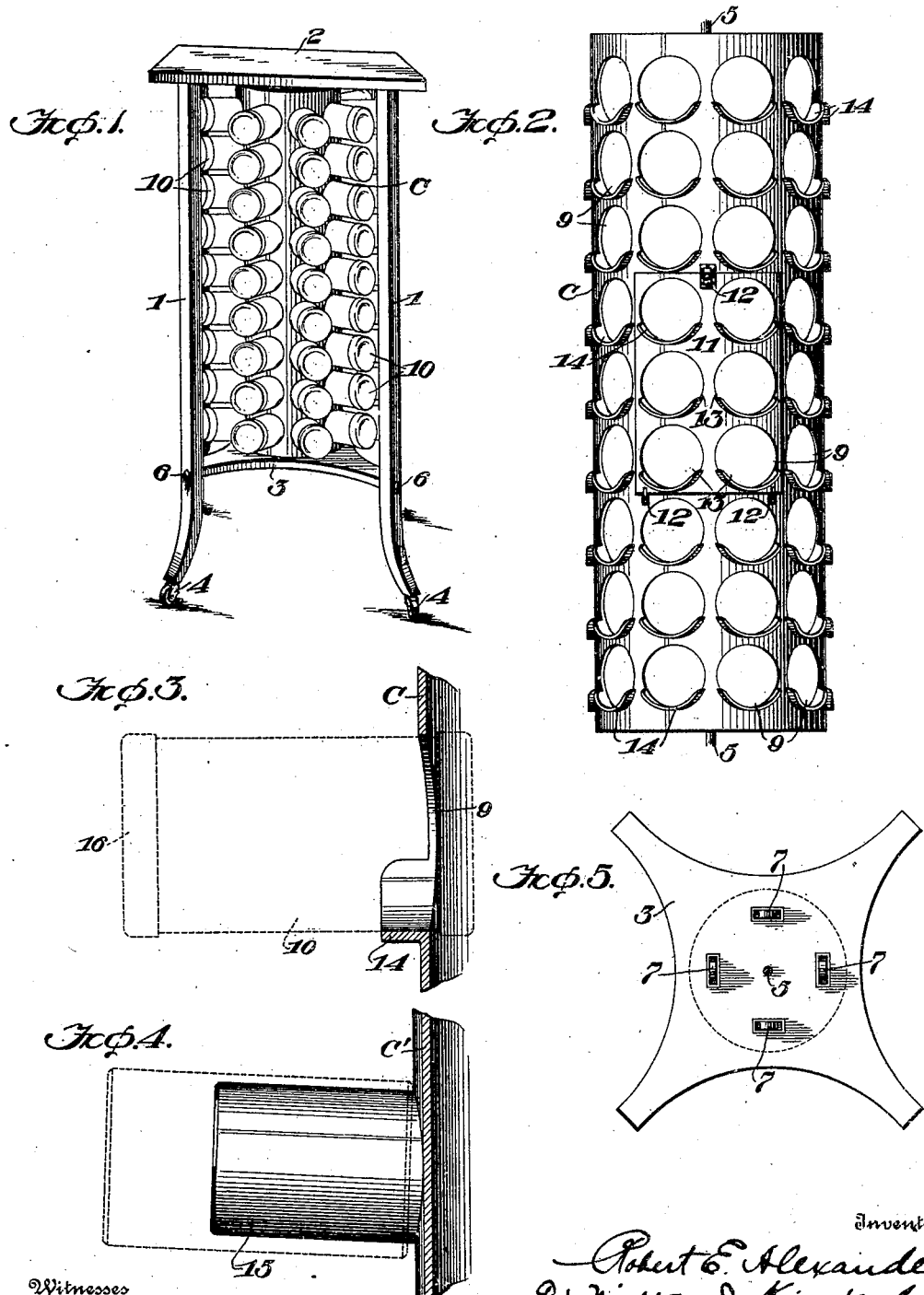

ROBERT E. ALEXANDER AND MILTON J. KNICKERBOCKER, OF ENDICOTT, NEW YORK.

HOLDER AND INDEX FOR PHONOGRAPH-RECORDS.

938,809.  Specification of Letters Patent.  Patented Nov. 2, 1909.

Application filed July 28, 1908. Serial No. 445,763.

*To all whom it may concern:*

Be it known that we, ROBERT E. ALEXANDER and MILTON J. KNICKERBOCKER, citizens of the United States, residing at Endicott, in the county of Broome and State of New York, have invented certain new and useful Improvements in Holders and Indexes for Phonograph-Records, of which the following is a specification.

Our invention relates to an improvement in holders and indexes for phonograph records, and it comprises a revoluble drum or cylinder constructed and adapted to receive and hold the records and their boxes in one form of the invention, or the records only in another form, in a convenient position both for the display of the name of the record and for gaining access to the record, and it is removable from the holder when a certain one is selected for use.

Our invention further consists in certain novel features of construction and combinations of parts which will be hereinafter described and pointed out in the claims.

In the accompanying drawings:—Figure 1 is a view in perspective showing one embodiment of our invention, Fig. 2 is a side view of one of the cylinders, Fig. 3 is an enlarged fragmentary view in vertical section taken through the orifice in which the record and box are inserted, Fig. 4 is a similar view of a slightly modified construction, and Fig. 5 is a plan view of the shelf upon which the drum or cylinder rests and turns.

In the illustrated embodiment of our invention, a stand is shown comprising legs 1, 1, top 2, and adjustable shelf 3. This stand is preferably mounted on casters 4, 4, which facilitate moving it about. The instrument is adapted to be placed on the top 2, and the drum or cylinder C containing the records is journaled between the upper surface of the shelf and the lower surface of the top by means of pins 5, 5, and the shelf 3, which is held in position by screws 6, 6, may be raised or lowered to different positions in accordance with the length of the drum or cylinder used.

Ball or roller bearings 7, 7, are mounted in the shelf in position to receive and sustain the lower end of the drum or cylinder and facilitate its turning.

The cylinder C is provided with rounded orifices 9, 9, of a size suitable to receive the boxes 10, 10, containing the records illustrated in dotted lines in Fig. 3. These boxes are inserted from the interior of the drum outward through a door 11 which is provided to gain access to the interior of the cylinder, it being closed by fastenings 12, 12, of any approved construction. The door has orifices 13, 13, similar to the orifices 9, 9, in the cylinder.

Curved brackets or rests 14, 14, project slightly from the lower edge of the orifices to afford support for the records and their boxes to hold them in an approximately horizontal position. Thus when the cylinder is filled with its full complement of records, the latter extend radially from the cylinder and just clear the legs 1, 1, as the cylinder is turned.

In the modified construction shown in Fig. 4, in lieu of the orifices C' on the cylinder, projections 15 are provided and these preferably incline slightly as illustrated, and are adapted to receive the records thereon as illustrated in dotted lines.

To briefly explain the operation and utility of our improvement, in the construction shown in Figs. 1, 2, and 3, the box containing the record is inserted from inside of the cylinder outward through the orifice with the cover of the holder outward. This cover preferably contains a number or some designating means corresponding to a similarly designated means on a card index opposite the title of the music referring to that record, so that when a record is desired, it is merely necessary to run the eye down the index and find the selection required, and its designating number, and then when the box or record having the corresponding number is found in the holder, the cover 16 of the box is removed and the record removed therefrom. When removed, the cover is usually replaced until the record is returned to its place.

More or less slight changes might be resorted to in the form and arrangement of the several parts described, and hence we do not wish to limit ourselves to the exact construction herein set forth, but:—

Having fully described our invention, what we claim as new and desire to secure by Letters Patent, is:—

1. A holder for phonograph records comprising a stand and a cylinder mounted to revolve upon the stand, said cylinder provided with orifices for receiving the records and an opening for gaining access to the interior of the cylinder.

2. A holder and index for phonograph records comprising a stand composed of top, bottom and legs, a cylinder mounted so that it turns between the top and bottom of the stand with its surfaces exposed, bearings on the bottom supporting the cylinder, said cylinder constructed and adapted to removably support and expose to view the records so that the titles of the records may be read through the open sides of the holder.

In testimony whereof we affix our signatures in presence of two witnesses.

ROBERT E. ALEXANDER.
MILTON J. KNICKERBOCKER.

Witnesses:
PETER J. WINEGARD,
CHAS. E. ST. MARTIN.